Aug. 25, 1959 E. B. SMITH 2,901,535

FREQUENCY SELECTIVE SIGNAL ATTENUATING CIRCUIT

Filed Nov. 8, 1954 2 Sheets-Sheet 1

INVENTOR.
EDWIN B. SMITH
BY [signature]
ATTORNEY

Aug. 25, 1959 E. B. SMITH 2,901,535

FREQUENCY SELECTIVE SIGNAL ATTENUATING CIRCUIT

Filed Nov. 8, 1954 2 Sheets-Sheet 2

INVENTOR.
EDWIN B. SMITH
BY
[signature]
ATTORNEY

United States Patent Office 2,901,535

Patented Aug. 25, 1959

2,901,535

FREQUENCY SELECTIVE SIGNAL ATTENUATING CIRCUIT

Edwin B. Smith, Collingswood, N.J., assignor to Radio Corporation of America, a corporation of Delaware Application November 8, 1954, Serial No. 467,418

3 Claims. (Cl. 178—5.8)

The present invention relates to new and improved frequency-selective signal attenuating circuits and, more particularly, to trap circuits of the type employed in the IF (intermediate frequency) channel of a television receiver.

In conventional television practice, it is customary to transmit video signals as amplitude modulation of a first carrier wave and the accompanying sound signals as frequency modulation of a second carrier wave separated from the video carrier wave by a fixed frequency (viz. 4.5 mcs.). By virtue of the fact that the frequency spacing between video and sound carrier waves is fixed at the transmitter, it has become conventional to exploit that the fact by designing television receivers of the so-called "intercarrier sound" variety. In an intercarrier sound television receiver, a common IF channel serves to amplify both the video and sound IF waves, the two waves being heterodyned in a non-linear impedance such as the usual video detector. The result of such heterodyning action is to provide the sound information in the form of a frequency-modulated 4.5 mcs. wave.

As is also well known, it is necessary to employ frequency selective attenuating circuits or "trap circuits" in the common IF channel of a television receiver in order to attenuate the accompanying sound signals to such an extent that they do not interfere with proper image reproduction. On the other hand, since sound production in an intercarrier receiver depends upon the retention of the 4.5 mc. intercarrier sound frequency, the rejection of the accompanying sound frequency must not be too great.

It is, therefore, a primary object of the present invention to provide new and improved means for trapping selected frequencies from a composite wave.

The matter of providing effective traps for accompanying sound frequencies has become more acute by reason of the use of video peaking circuits which are often provided in the video amplifier stages of a television receiver for selectively increasing the amplitude of video frequencies near the upper end of the video pass band. Since the accompanying sound frequencies lie just past the usual 4 mc. cut off point of a television receiver, any 4.5 mc. intercarrier beat which is present in the video signals can result in objectionable "edge agitation" in the reproduced picture, since that frequency would be "peaked" by the video circuits.

Hence, it is a further object of the invention to provide new and improved means for trapping out the accompanying sound frequencies in a television receiver.

It has been found that an effective trap circuit for accompanying sound in a television receiver should provide a high level of rejection for conditions of high amplitude carrier reception; that is, when the amplitude of the received signals is high. On the other hand, accompanying sound rejection should be low at low signal levels in order for proper sound rendition to be afforded.

Thus it is still another object of the present invention to provide novel trap means for automatically affording the desired degree of rejection of a selected frequency, depending upon the amplitude or level of the signals being operated upon.

In general the present invention provides means for trapping the accompanying sound carrier wave in the IF channel of a television receiver, which means may be in the nature of a well known absorption type of trap circuit which is inductively coupled to an IF coupling transformer. Means are additionally provided by the invention for varying the "Q" of the trap circuit generally in proportion to the level of the incoming signal. In accordance with a specific form of the invention, an absorption type trap circuit is connected in the cathode lead of a grid-controlled vacuum tube, the bias on the control grid being derived from an automatic gain control voltage source. Thus, the trap Q is caused to increase at high signal levels and to decrease at low signal levels, thereby affording in a simple manner, the necessary degree of sound rejection as a function of carrier amplitude.

In accordance with other forms of the invention, the absorption trap circuit is associated with an electron discharge device whose conduction is controlled suitably by an AGC type voltage so that the Q of the trap is varied generally in proportion to the amplitude of the received signals.

Additional objects and advantages of the present invention will become apparent to those skilled in the art from a study of the following detailed description of the accompanying drawing, in which.

Figure 1:
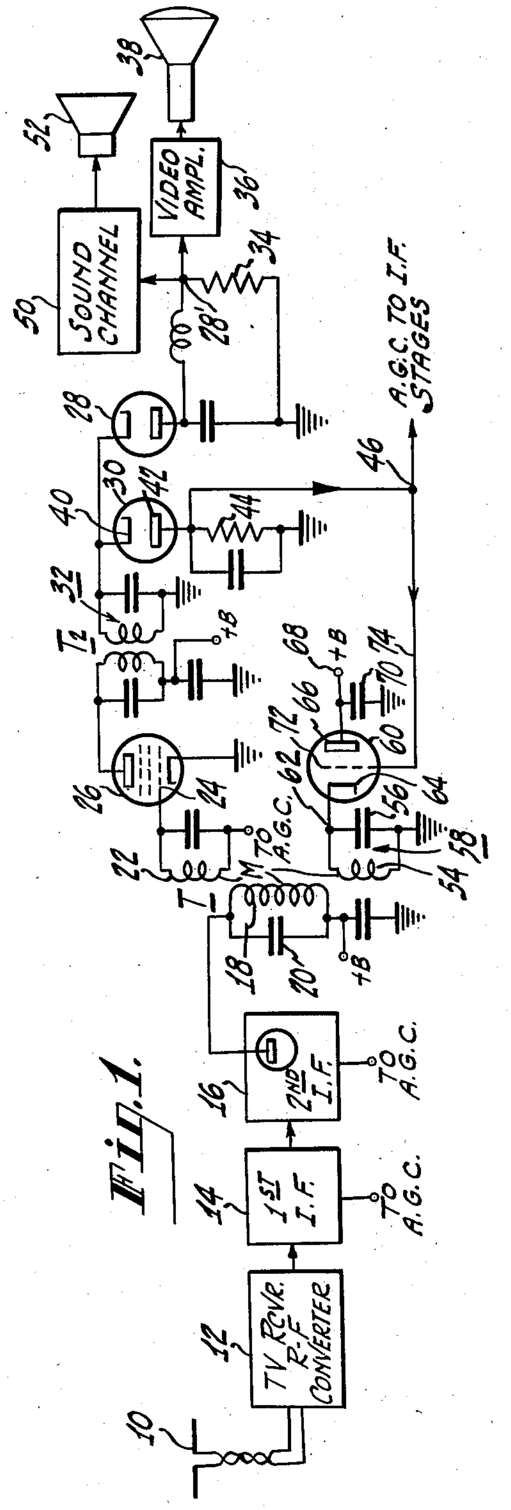
Figure 1 illustrates, by way of a block and schematic circuit diagram, a television receiver embodying one form of the invention.

Referring to the drawing and, particularly, to Figure 1 thereof there is shown a conventional intercarrier sound television receiver. Since the principles of intercarrier sound receivers are described in U.S. Patent No. 2,448,908 granted September 7, 1948, to L. W. Parker, the general operation of such a receiver need not be described in detail here. Briefly, however, a composite television carrier wave including both video and sound signal modulated waves separated in frequency by 4.5 mcs. is intercepted by an antenna 10 and applied to the input terminals of a tuner section 12 which may conventionally include the radio frequency amplifier stages and first detector or converter stage. The output of the tuner section 12 is applied to the first of several intermediate frequency amplifier stages which are common to both the video and sound IF waves which may, for example, be 45.75 mcs. and 41.25 mcs., respectively.

After suitable amplification in the stage 14, the IF waves are further amplified in a stage 16 and appear at the output circuit thereof, which circuit comprises the parallel resonant band pass circuit consisting of an inductance 18 and shunt capacitor 20. The inductance 18 comprises the primary winding of a transformer T whose secondary winding 22 is coupled to the control grid 24 of a succeeding IF amplifier 26. The output of the IF amplifier 26 is coupled by means of the double-tuned transformer $T_2$ to a pair of diodes 28 and 30 which are connected in parallel across the tuned circuit 32. The diode 28 serves conventionally as the video detector and provides across its load resistor 34 the detected video signals which are suitably amplified by a stage 36 and applied as a beam intensity controlling signal to the input terminal of a kinescope 38.

The diode 30 which includes a cathode 40 and anode 42 serves in a well known manner as a source of automatic gain control signals (i.e. AGC). That is to say, the diode 30 peak-detects the received video signals so that there is available across its load resistor 44 a direct current voltage of negative polarity, the amplitude of which is proportional to the amplitude of the received signals. The AGC voltage thus provided at the terminal 46 is applied to the control grids of the IF amplifiers 14, 16 and 26, as designated in the drawing.

Also available at the output terminal 28′ of the video detector 28 is the 4.5 mc. intercarrier sound beat which consists of a 4.5 mc. wave which is frequency-modulated by the sound signals accompanying the image signals being reproduced. The 4.5 mc. sound wave is thus applied to a sound channel 50 including the sound IF (4.5 mc.) amplifier stages, a frequency modulation detector such as a discriminator, and an audio amplifier which controls the operation of the loud speaker 52.

In order that the accompanying sound frequencies may be suitably attenuated so that they do not interfere with the video signals employed in reproducing the television image on the face of the kinescope 28, a trap circuit comprising the winding 54 of the transformer T and a shunt capacitor 56 is provided and is designated generally by the reference numeral 58. The trap circuit 58 is in the form of an absorption trap and is tuned to the frequency being trapped (e.g. 41.25 mcs.). As thus far described, the trap 58 operates to absorb the sound IF wave in an amount which is generally proportional to the Q of the resonant circuit made up of the inductance 54 and capacitor 56. In general, the Q of a parallel resonant circuit depends upon the resistance in circuit therewith $$\left(Q=\frac{WL}{R}\right)$$

so that, in a conventional receiver, the Q of an absorption type sound trap is determined initially by the inductive and capacitive components making up the trap. Thus, in a conventional receiver the absorption characteristics of such a trap and, therefore, its rejection characteristics are the same for all signal levels. As has been pointed out supra, it is desirable to afford increased rejection for high signal levels and to decrease the degree of rejection for low signal levels, in order that the somewhat incompatible purposes of sound-trapping for video reasons and sound-retention for aural reasons may be served. Hence, in accordance with the present invention, means are provided for varying the Q of the sound trap automatically as a function of signal level.

In accordance with the form of the invention shown in Figure 1, the absorption trap 58 is connected in the cathode lead of a control triode 60. That is to say, one terminal 62 of the trap circuit is connected to the cathode 64 of the triode, while the other terminal of the trap circuit is connected to "ground." The anode 66 of the triode 60 is connected to a source of positive operating potential (+B) at the terminal 68 and is by-passed for intermediate frequencies by means of a capacitor 70. The control grid 72 of the triode 60 is connected via a lead 74 to the AGC terminal 46 at which there is available, as has been stated, a negative D.-C. voltage whose amplitude varies in proportion to signal level.

In the operation of the automatic sound rejection trap circuit of Figure 1, and assuming that the level of the received signals being operated upon is high, the D.-C. control voltage at the terminal 46 will be large, in order that the bias on the IF amplifiers may be suitably increased in the usual manner. This relatively high negative potential is also applied via the lead 74 to the triode control grid 72 and is sufficient to cut off anode-cathode conduction in the triode. With the triode 60 cut off, the triode has substantially no effect upon the Q of the trap circuit 58, so that the Q thereof will be a maximum, the exact value being dependent upon the choice of the components 54 and 56. With a maximum Q, the trap circuit 58 affords maximum sound rejection characteristics, as desired.

Assuming, on the other hand, that the level of the received signals decreases, so that it is desirable for the degree of rejection of the trap 58 to decrease correspondingly, the lower negative potential provided by the AGC diode 30 at its output terminal 46 decreases the bias on the triode control grid 72, thereby permitting anode-cathode conduction to occur in that tube and in an amount determined inter alia by the value of the bias. Thus, with the triode 60 conducting, the cathode impedance reduces the Q of the trap circuit 58 so that the degree of rejection is correspondingly decreased. Since the cathode impedance of a triode is approximately inversely proportional to the $G_m$ (transconductance) and, since the $G_m$ of such a tube varies almost in proportion to its anode-cathode current, the circuit of Figure 1 affords a wide range of control over the Q of the trap circuit 58. Moreover, such a wide range has been found to be produced with the use of the conventional range of AGC voltages.

Figure 2:
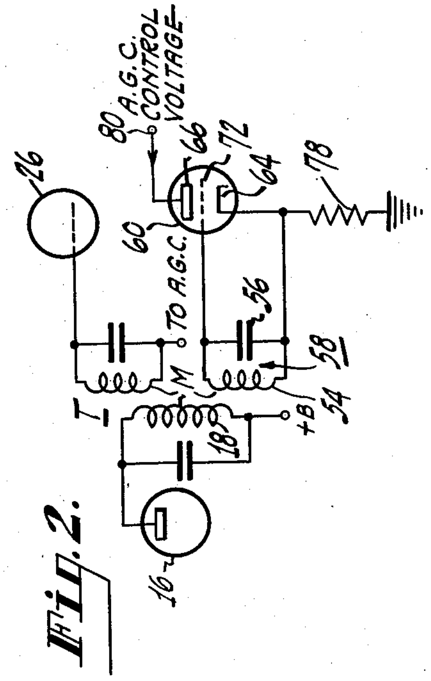

Figure 2 illustrates another form of the invention and reference numerals identical to those employed in Figure 1 designate corresponding elements. In the form of Figure 2, the trap circuit 58 is again of the absorption type and is inductively coupled to the primary winding 18 of the IF coupling transformer between the IF amplifier 16 and the succeeding IF amplifier 26. The trap circuit 58 consists of the parallel combination of an inductive winding 54 and a capacitor 56 and is connected between the control grid 72 and cathode 64 of a control tube 60. The cathode 64 of the triode is connected to ground potential through a biasing resistor 78, while the anode 66 is connected to a terminal 80 which is designated for connection to a source of AGC voltage, that is, a voltage of negative polarity varying in amplitude in proportion to signal level.

While the exact theory of operation of the form of the invention shown in Figure 2 has not been completely established, one explanation thereof is as follows: The Q of the trap circuit 58 varies generally inversely as the resistance in series with the trap circuit. The control grid 72 and cathode 64 of the triode 60 serve, respectively, somewhat as the anode and cathode of a diode so that, in the absence of the anode 66, the signals induced in the trap circuit 58 will cause current to flow unilaterally from the control grid 72 to the cathode 64. Such current, depending upon its magnitude, will decrease the Q of the trap circuit. When signal amplitude is at its minimum, for example, the AGC type voltage applied to the anode 66 of the triode will be a minimum, so that the diode action of the control grid and cathode of the tube is not appreciably affected. On the other hand, increased signal level results in the application of a higher negative potential to the triode anode 66, which negative potential serves to repel electrons from the grid, thereby effectively opening the circuit between control grid and cathode. With no current flowing between those elements of the tube 60, the Q of the trap circuit 58 is restored to its maximum value. For intervening signal levels between the assumed minimum and maximum levels of the foregoing examples, the diode action occurring in the triode 60 is caused to vary in accordance with the AGC voltage applied to the anode 66, so that the Q of the trap circuit may be correspondingly altered with changing signal level.

It has been found that, in the form of the invention illustrated in Figure 2, a greater range of AGC or control voltage is required than in the form of Figure 1 to cause the Q of the trap circuit to vary over its complete gamut. Hence, the AGC voltage may be suitably amplified in a D.-C. amplifier (not shown) prior to application to the anode 66 of the control tube in Figure 2.

Figure 3:
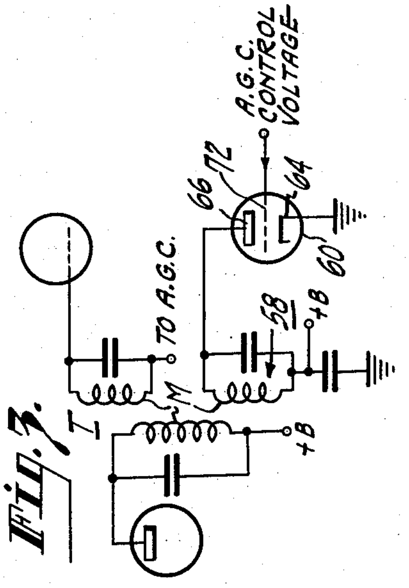
Figures 2, 3 and 4 represent schematically additional forms of the invention.

In Figure 3 there is illustrated another form of the invention having in common with the embodiments of Figures 1 and 2 the fact that it includes an absorption type trap circuit 58 which is inductively coupled to the IF transformer T, which trap circuit has associated therewith a triode 60 which serves to vary the Q of the trap generally in proportion to signal level. In the form of Figure 3, however, the trap circuit 58 is connected to the anode 66 of the control triode whose cathode 64 is connected to ground potential and whose control grid 72 is adapted to receive an AGC type of voltage from a source such as the terminal 46 in Figure 1. As in the case of Figure 1, the variable Q trap circuit of Figure 3 operates as a function of the anode-cathode conduction of the control tube. As opposed to the first-described embodiment, the trap circuit of Figure 3 is varied as to Q by the plate resistance (*rp*) of the triode 60. For the case of high signal level, the AGC voltage applied to the control grid 72 is a high negative potential which, for the limiting condition, is sufficient to cut off conduction of the tube, so that the trap circuit 58 has substantially no external resistance in series with it. As signal level decreases, the bias applied to the control grid 72 correspondingly decreases, thereby causing an increase in conduction in the triode, which increased conduction brings about a decreased degree of sound frequency rejection by the trap circuit. One operational aspect in which the embodiment of Figure 3 differs from that of Figure 1 is that the plate resistance of the triode does not decrease below a certain fixed value, so that the lower limit of the trap circuit's Q is thereby higher than that which may be obtained with the circuit of Figure 1.

Figure 4:
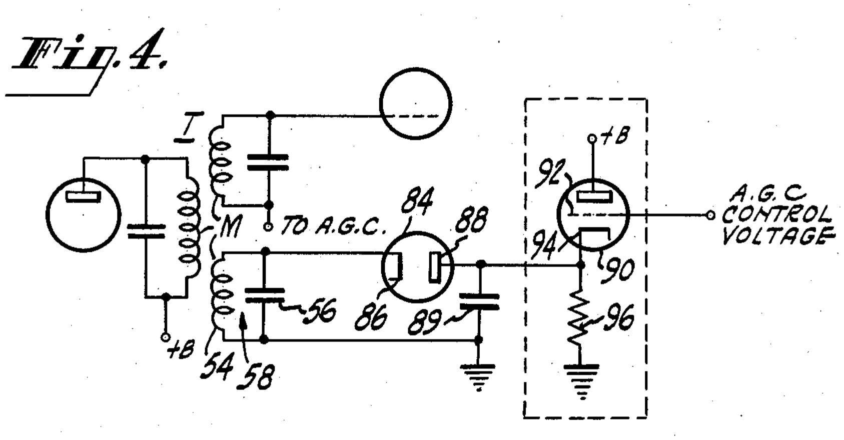

In Figure 4, an absorption type trap circuit 58 comprising the parallel combination of an inductive winding 54 and a shunt capacitor 56 is inductively coupled to the IF transformer T. In circuit with the trap is a diode 84 whose cathode 86 is connected to one terminal of the trap circuit and whose anode 88, by-passed for intermediate frequencies by a capacitor 89, is provided with an AGC type of control voltage varying in the negative direction from a maximum during the reception of high signal levels and minimum for low signal levels. The source of such control voltage is illustrated as a cathode-follower 90 whose control grid 92 may be connected directly to a point such as the terminal 46 of Figure 1. The cathode 94 of the cathode-follower 90 is connected to ground potential through an unbypassed resistor 96. For a condition of high signal level, the potential applied to the diode anode 88 is sufficiently negative as to prevent conduction by the diode, thereby effectively permitting the Q of the trap circuit 58 to attain its maximum value. For low signal level conditions, the bias applied to the anode 88 from the cathode-follower 90 is decreased sufficiently to permit the diode to conduct, thereby correspondingly decreasing the trap circuit Q.

The reason for the employment of a cathode-follower in supplying the AGC voltage to the diode in Figure 4 is that the control voltage source for the diode must deliver current thereto, thus rendering a low impedance source desirable. Since the cathode follower 90 is a low impedance circuit insofar as conduction of the diode is concerned, no undesirable loading effect is produced upon the AGC circuit from which the control voltages are derived. The diode arrangement of Figure 4 affords a wide range of Q variation for the trap circuit for a relatively small range of control voltages.

Figure 5:
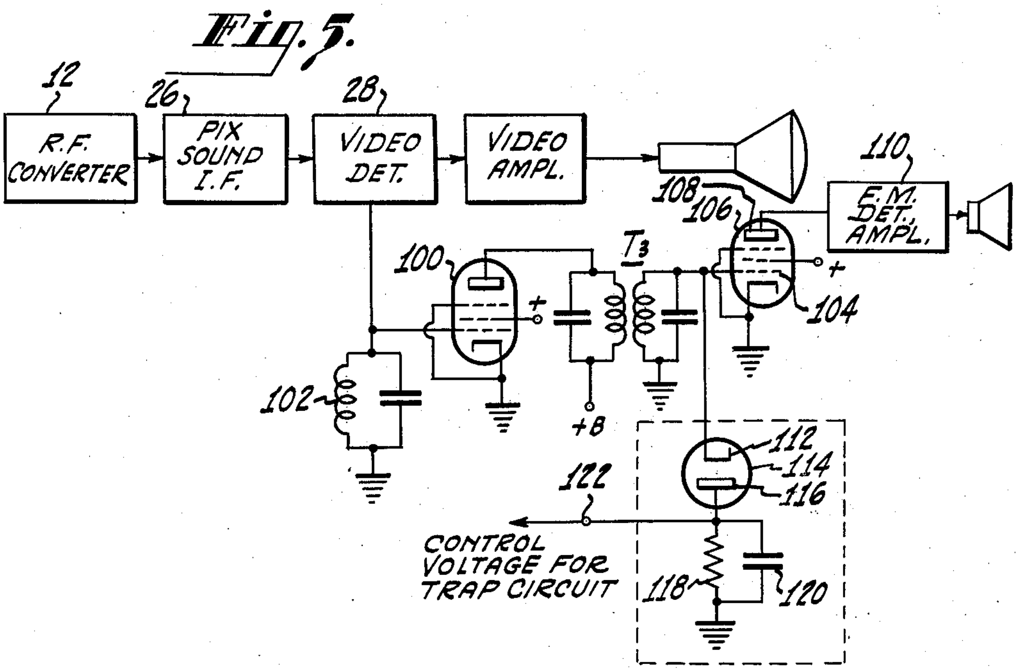
Figure 5 illustrates still another form of the invention.

While the foregoing illustrative forms of the invention have employed the usual AGC voltage normally applied to the IF amplifiers as the controlling voltage for the Q-varying electron discharge device, it will be understood that other sources of such a control voltage may be satisfactorily employed. Figure 5 illustrates the fact that one suitable source of control voltage for varying the Q of the sound trap circuits of Figures 1 through 4 is an auxiliary detector which may be connected in circuit with the sound IF amplifier. That is to say, most intercarrier sound receivers include, as shown in Figure 5, several stages of sound IF amplification following the video detector 28 for amplifying the 4.5 mc. intercarrier sound beat. The amplifier 100 in Figure 5 receives the 4.5 mc. sound information via a resonant circuit 102 tuned to that frequency and supplies the amplied sound IF signals to the control grid 104 of a second sound IF amplifier 106 through the double tuned coupling transformer $T_3$. The output of the amplifier 106, taken from its anode 108, is applied to a sound detector 110 which may be in the form of a conventional frequency modulation discriminator. Connected to the control electrode 104 is the cathode 112 of a peak detector diode 114 whose anode 116 is connected to ground potential through a load circuit comprising a resistor 118 and a by-pass capacitor 120 which furnishes a low impedance path to ground for 4.5 mcs. At the output terminal 122 of the detector 114 is a D.-C. voltage of negative polarity whose amplitude varies generally in proportion to signal level (i.e. sound signal amplitude). The signal thus available at the terminal 122 may be employed in place of the usual AGC voltage described in connection with Figures 1 through 4. That is to say, although an amplifier may be required for an embodiment such as that shown in Figure 2 and a cathode follower for the embodiment of Figure 4, the voltage provided at the terminal 122 in Figure 5 may be considered operatively the same as that provided at the terminal 46 in Figure 1. One advantage of the arrangement shown in Figure 5 is that improved amplitude control is provided by reason of the "feedback" loop which may be traced through the sound IF amplification channel.

From the foregoing it will be recognized that the present invention provides novel means which, while simple circuitwise, may be effectively employed in controlling the degree of rejection of a selected frequency such as the accompanying sound intermediate frequency of a television receiver.

Having thus described my invention, what I claim as new and desire to secure by Letters Patent is:

1. Apparatus comprising a source of signals; a signal utilization circuit; means for coupling signals from said source to said utilization circuit, said coupling means having a pass band encompassing an associated signal frequency; a signal trapping circuit associated with said coupling means and comprising a resonant circuit tuned to said associated signal frequency between said source and utilization circuit; means for detecting the amplitude of such signals; means including an electron discharge device defining a current path which includes said trapping circuit; and means coupled to said amplitude-detecting means for varying the conduction of said electron discharge device in such manner as to vary the response of said trapping circuit as a function of signal amplitude, said electron discharge device having a cathode, an anode and a control grid, said trapping circuit being connected in series with said anode and cathode, and said conduction varying means comprising a coupling between said amplitude-detecting means and said control grid.

2. The invention as defined by claim 1 wherein said trapping circuit is connected between said cathode and a point of fixed potential.

3. In a television receiver including an intermediate frequency amplifier comprising a plurality of interstage coupling transformers and also including a source of AGC potential representative of the amplitude of received television signals, the combination comprising: a trap circuit comprising a parallel resonant circuit including an inductance inductively coupled to one of said interstage coupling transformers, an electron discharge device having a cathode, an anode and a control grid, means for connecting said anode to a source of energizing potential, means for connecting said resonant circuit between said cathode and a point of reference potential, and means for coupling said control grid to said source of AGC potential such that the Q of said trap circuit is effectively varied as a function of the amplitude of the received television signal.

References Cited in the file of this patent

UNITED STATES PATENTS

| | | |
|---|---|---|
| 2,255,690 | Wheeler | Sept. 9, 1941 |
| 2,632,047 | Schlesinger | Mar. 17, 1953 |
| 2,773,119 | Parker | Dec. 4, 1956 |

FOREIGN PATENTS

| | | |
|---|---|---|
| 526,740 | Belgium | Mar. 15, 1954 |
| 461,360 | Great Britain | Feb. 16, 1937 |

OTHER REFERENCES

Mayer: Automatic Selectivity Control, Electronics, December 1936, pages 32–34.